(12) United States Patent
Champavere

(10) Patent No.: US 11,703,397 B2
(45) Date of Patent: Jul. 18, 2023

(54) OPTICAL FIBER IDENTIFICATION AND DISTANCE MEASUREMENT

(71) Applicant: Viavi Solutions France SAS, Plaisir (FR)

(72) Inventor: Andre Champavere, Saint-Bonnet les Oules (FR)

(73) Assignee: Viavi Solutions France SAS, Plaisir (FR)

( * ) Notice: Subject to any disclaimer, the term of this patent is extended or adjusted under 35 U.S.C. 154(b) by 737 days.

(21) Appl. No.: 16/691,262

(22) Filed: Nov. 21, 2019

(65) Prior Publication Data
US 2021/0123817 A1 Apr. 29, 2021

(30) Foreign Application Priority Data
Oct. 28, 2019 (EP) ..................................... 19306401

(51) Int. Cl.
*G01K 11/32* (2021.01)
*G01D 5/353* (2006.01)
*G01M 11/00* (2006.01)
*G01K 11/324* (2021.01)

(52) U.S. Cl.
CPC ......... *G01K 11/32* (2013.01); *G01D 5/35361* (2013.01); *G01D 5/35364* (2013.01); *G01M 11/3154* (2013.01); *G01K 11/324* (2021.01)

(58) Field of Classification Search
None
See application file for complete search history.

(56) References Cited

U.S. PATENT DOCUMENTS

| | | | |
|---|---|---|---|
| 9,429,480 B2 | 8/2016 | Smith et al. | |
| 10,880,007 B1 * | 12/2020 | Hveding | G01D 5/35361 |
| 2015/0233771 A1 | 8/2015 | Uno et al. | |
| 2015/0260588 A1 * | 9/2015 | Babin | G01K 11/32 374/161 |

FOREIGN PATENT DOCUMENTS

| | | |
|---|---|---|
| CN | 106209218 A | 12/2016 |
| WO | 2007048226 | 5/2007 |
| WO | 2015/136487 | 9/2015 |

* cited by examiner

*Primary Examiner* — Chad H Smith
(74) *Attorney, Agent, or Firm* — Mannava & Kang, P.C.

(57) ABSTRACT

In some examples, optical fiber identification and distance measurement may include utilizing a reflectometer and optical fiber connection device that includes a Rayleigh wavelength pass filter to pass, in one direction, an optical reflectometer signal to an optical fiber. The reflectometer and optical fiber connection device may include a Raman wavelength pass filter to filter out, in another direction, Rayleigh backscattering from the optical reflectometer signal. Further, the Raman wavelength pass filter may pass, in the another direction, a Raman Anti-Stokes signal from the optical fiber.

20 Claims, 13 Drawing Sheets

1400

CONTROL, IN ONE DIRECTION, PASSAGE OF AN OPTICAL REFLECTOMETER SIGNAL TO AN OPTICAL FIBER
1402

CONTROL IN ANOTHER DIRECTION, PASSAGE OF RAYLEIGH BACKSCATTERING FROM THE OPTICAL REFLECTOMETER SIGNAL
1404

CONTROL, IN THE ANOTHER DIRECTION, PASSAGE OF A RAMAN SIGNAL FROM THE OPTICAL FIBER
1406

IDENTIFY, BASED ON THE RECEIVED RAMAN SIGNAL AND A TEMPERATURE STIMULUS APPLIED TO THE OPTICAL FIBER, THE OPTICAL FIBER FROM A PLURALITY OF OPTICAL FIBERS
1408

*FIG. 14*

OPTICAL FIBER IDENTIFICATION AND DISTANCE MEASUREMENT

PRIORITY

The present application claims priority under 35 U.S.C. 119(a)-(d) to European patent application number 19306401.1, having a filing date of Oct. 28, 2019, the disclosure of which is hereby incorporated by reference in its entirety.

BACKGROUND

A fiber optic cable may include one or more optical fibers. The optical fibers may transmit light from a source to a destination. For fiber optic cables that include several optical fibers, one or more of the optical fibers identified at an upstream (e.g., near end) location may also need to be accurately identified at a downstream (e.g., far end) location, for example, for maintenance, testing, and other purposes.

BRIEF DESCRIPTION OF DRAWINGS

Features of the present disclosure are illustrated by way of example and not limited in the following figure(s), in which like numerals indicate like elements, in which:

FIG. 14 illustrates a flowchart of an example method for optical fiber identification and distance measurement in accordance with an example of the present disclosure.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Optical fiber identification and distance measurement systems, and methods for optical fiber identification and distance measurement are disclosed herein. The systems and methods disclosed herein provide for an OTDR and optical fiber connection device that may be inserted between an OTDR and a near end of an optical fiber. In this regard, the OTDR and optical fiber connection device may effectively convert an OTDR into an optical fiber identifier by using a temperature stimulus on the optical fiber to identify the optical fiber. The OTDR and optical fiber connection device may provide for identification of an optical fiber and measurement of an associated distance based on measurement of a loss difference of a Raman backscatter signal before and after a temperature stimulus is applied on the optical fiber to be identified.

As disclosed herein, fiber optic cables may integrate a plurality of optical fibers. For example, fiber optic cables may include a density on the order of a few optical fibers to several thousand optical fibers per cable. Examples of fiber optic cables may include general fiber optic cables that include optical fibers disposed in a common sheath, patch cords, other types of multi-fiber cables, ribbon cables, etc. In some cases, one or more of the optical fibers of a fiber optic cable may need to be accessed, for example, for testing, maintenance, troubleshooting, or for other purposes. For the optical fiber that is to be accessed, neighboring optical fibers may need to continue to transmit traffic irrespective of the operation being performed with respect to the accessed optical fiber.

Figure 2:
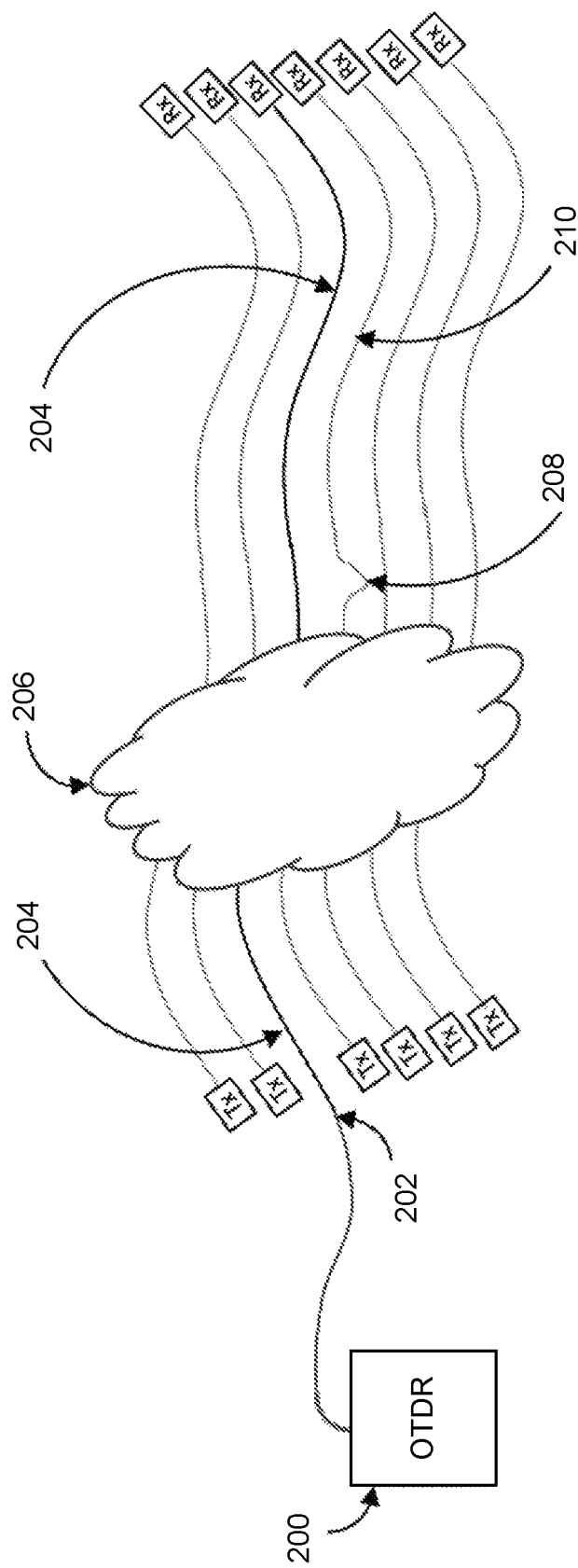
FIG. 2 illustrates an optical time domain reflectometer (OTDR) connected to an optical fiber that is to be identified in accordance with an example of the present disclosure.

In some cases, in order to identify an optical fiber that is to be accessed, an optical time domain reflectometer (OTDR) may be connected at one end (e.g., a transmission end) of the optical fiber. For example, FIG. 2 illustrates an OTDR 200 connected to a near end 202 of an optical fiber 204 that is to be identified in accordance with an example of the present disclosure. The topology of the network 206 may include various uncertainties associated with an environment of the optical fibers. For example, the environment may depend on whether the optical fibers are buried, whether the optical fibers are exposed, the length of the optical fibers, various bends in the optical fibers, etc. A bend loss may be created at 208 on an optical fiber 210 (which may be presumed to be the optical fiber 204) in an attempt to identify the optical fiber 204. In this regard, the optical fiber 210 does not correspond to the optical fiber 204, and thus valuable time may be spent towards identifying the optical fiber 204, when in fact the bend loss is introduced in another optical fiber (e.g., the optical fiber 210). Moreover, the physical process of implementing the bend loss in the optical fiber 210 may inadvertently damage the optical fiber 210, and other optical fibers, including the optical fiber 204, in which a bend loss is created in an attempt to identify the optical fiber 204. Yet further, the optical fibers may be disposed inside a fiber-optic cable that includes a rigid structure that does not allow for sufficient bending to create a detectable optical loss. Accordingly, it is technically challenging to identify an optical fiber that is to be accessed while eliminating the aforementioned technical challenges related to bending of an incorrect optical fiber, inadvertently damaging an optical fiber during bending, and insufficient bending of an optical fiber, as well as any other technical challenges related to optical fiber identification.

In order to address at least the aforementioned technical challenges, as disclosed herein, the systems and methods disclosed herein may include an OTDR and optical fiber connection device that may be inserted between an OTDR and a near end of an optical fiber. In this regard, the OTDR and optical fiber connection device may effectively convert an OTDR into an optical fiber identifier by using a temperature stimulus on the optical fiber to identify the optical fiber. The OTDR and optical fiber connection device may provide for measurement of a loss difference of a Raman backscatter signal before and after a temperature stimulus is applied on the optical fiber to be identified. The OTDR and optical fiber connection device may operate without the need to acquire both the Stokes and Anti-Stokes components of the Raman backscatter as the device does not target any temperature measurements that use the Anti-Stokes/Stokes ratio. Moreover, the OTDR and optical fiber connection device may operate without the need to compensate for differential attenuation that may bias a temperature measurement or without the need for temperature calibrations that may be needed for absolute temperature measurements.

Figure 1:
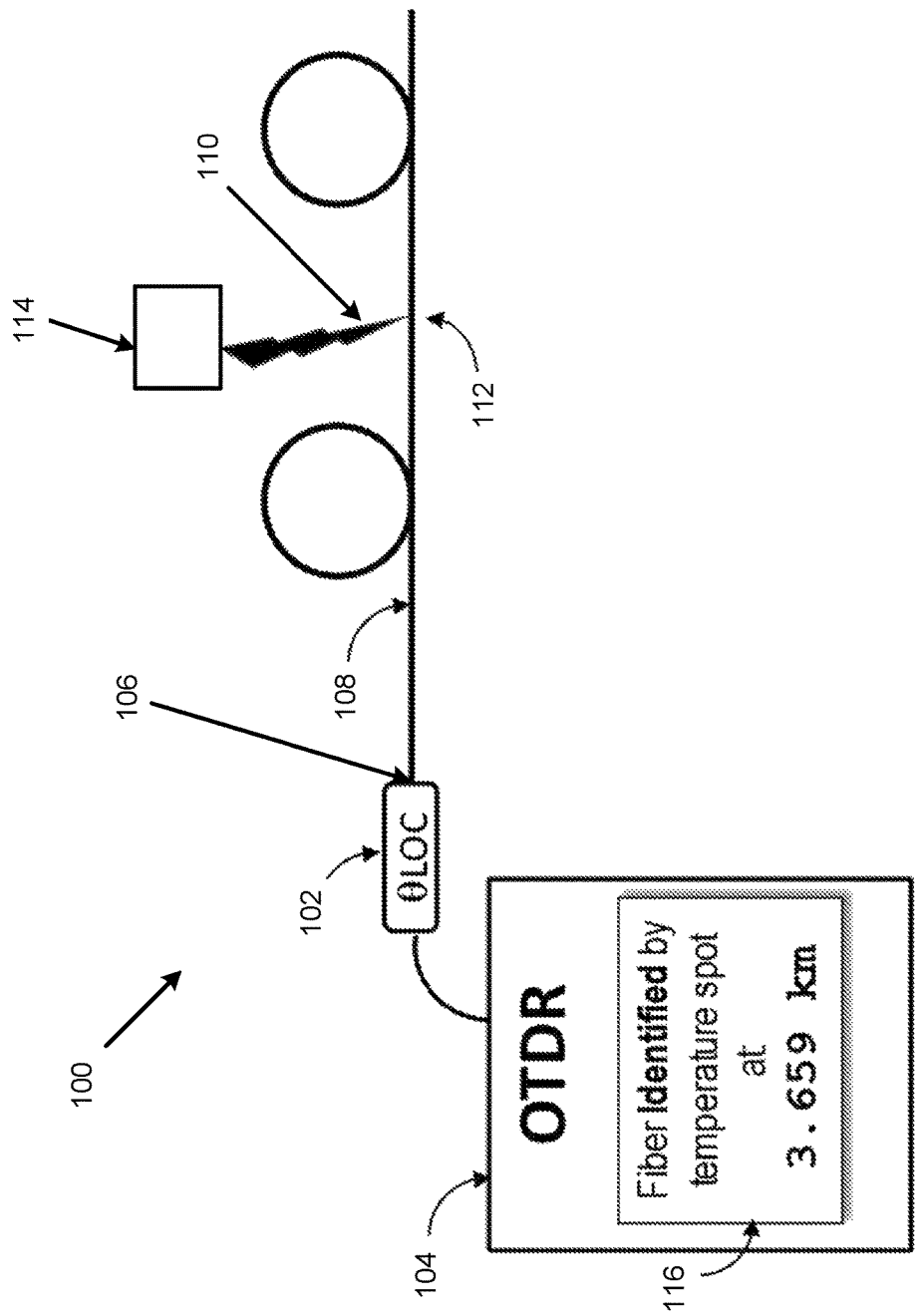
FIG. 1 illustrates an architectural layout of an optical fiber identification and distance measurement system in accordance with an example of the present disclosure.

FIG. 1 illustrates an architectural layout of an optical fiber identification and distance measurement system (hereinafter also referred to as "system 100") in accordance with an example of the present disclosure.

Referring to FIG. 1, the system 100 may include an OTDR and optical fiber connection device 102 that it is operatively disposed between an OTDR 104 and a near end 106 of an optical fiber 108 to be identified. The OTDR and optical fiber connection device 102 may also be referred to as a BLOC device, or a reflectometer and optical fiber connection device. The OTDR 104 may also be referred to as a fiber optic optical reflectometer.

A temperature stimulus 110 may be applied at a specified location 112 of the optical fiber 108. The temperature stimulus 110 may be applied by a temperature application source 114. The temperature application source 114 may include a remote controlled temperature application source to generate the temperature stimulus 110 upon actuation of the temperature application source 114. The temperature stimulus 110 may include the heating up or cooling down of a portion of the optical fiber 108 at the specified location 112. In this regard, the temperature stimulus 110 may be detected by a temperature spot detection and localization process of the OTDR 104 (as disclosed herein with respect to FIG. 3). As an example, a 90° C. temperature stimulus applied on a fiber optic cable operating at 30° C., may translate after a one-minute warm-up time to a 30° C. positive offset on the optical fiber cable leading to an approximately 1 dB local increase of the anti-Stoke signal. These performances may depend on the fiber optic cable structure and its characteristic in terms of heat transfer function and on its environment.

An identification status of the optical fiber 108 may be reported on an OTDR display 116. In this regard, the identification status may include an indication that the optical fiber 108 has been identified by a temperature spot at a specified location (e.g., distance from the near end of the optical fiber 108). Thus, the distance measurement with respect to the optical fiber 108 may represent a distance from a near end of the optical fiber 108 to the location 112 of the temperature stimulus 110.

Figure 3:
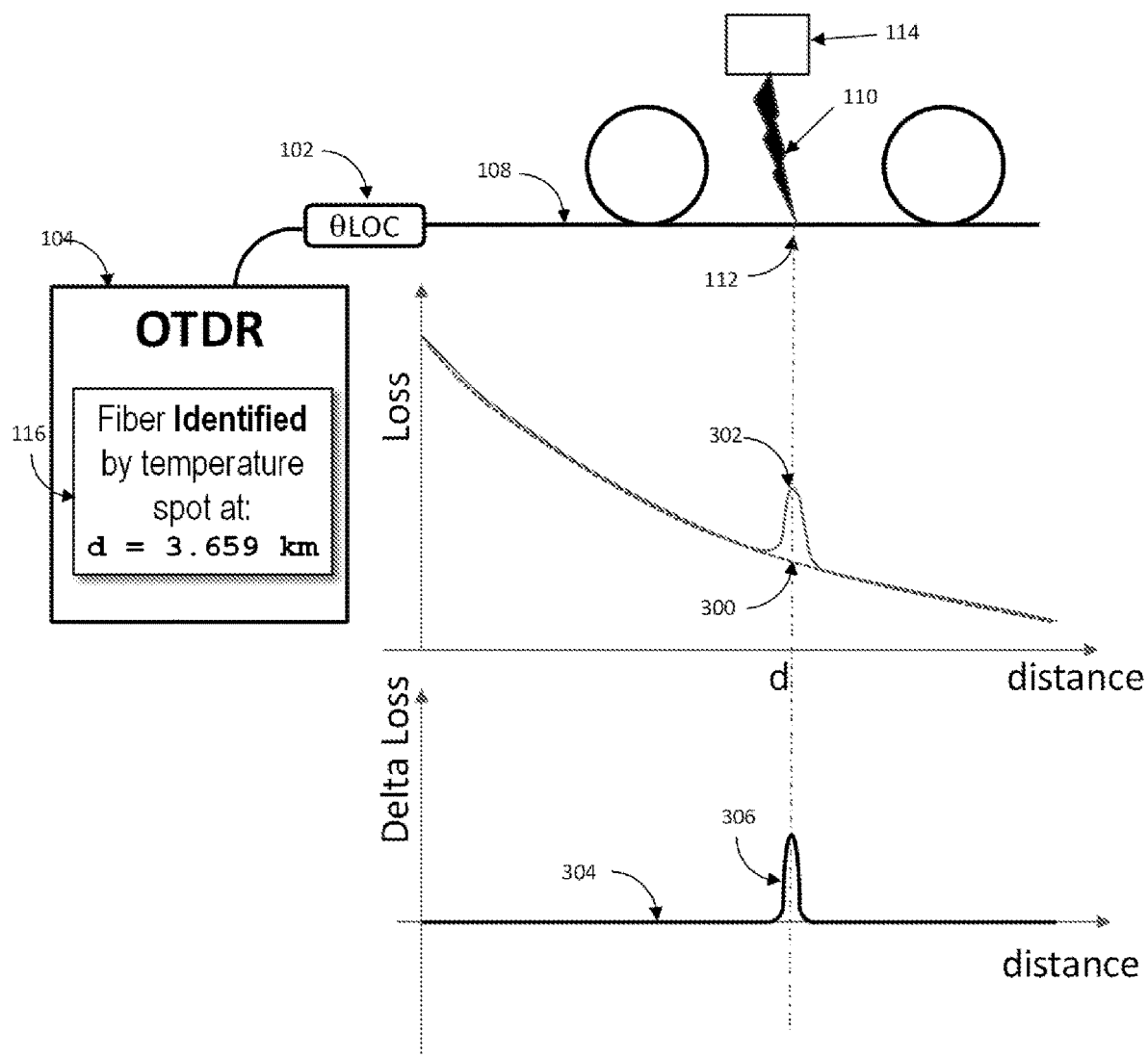
FIG. 3 illustrates a schematic principle of optical fiber distance measurement to illustrate operation of the optical fiber identification and distance measurement system of FIG. 1 in accordance with an example of the present disclosure.

FIG. 3 illustrates a schematic principle of optical fiber distance measurement to illustrate operation of the system 100 in accordance with an example of the present disclosure.

Referring to FIG. 3, the temperature spot detection and localization process of the OTDR 104 for location (e.g., distance measurement of the location of the temperature stimulus) of the optical fiber may be based on temperature sensitivity of the Raman backscattering signal. In this regard, an amplitude comparison of the Raman backscattering signal before and after application of the temperature stimulus may provide for the detection and localization of the optical fiber. The example of FIG. 3 is given under signal-to-noise conditions which make it possible to obtain traces on which the amplitude deviation related to the temperature stimulus remains possible. Thus, the measurement range may depend on the measurement dynamics of the reflectometer used. Curves too noisy linked to a too weak dynamic may not be able to locate the useful signal of the noise. Further, the measurement principle for location of the optical fiber may utilize an attenuation profile (e.g., attenuation versus distance) of one of the two Raman signals (e.g., anti-Stokes), without performing actual temperature measurements. In order to detect the local amplitude difference of the Raman signal, various techniques may be used. By way of example, amplitude thresholds may be used to trigger on a difference in amplitude of the two traces. These thresholds may be adjusted according to the level of noise on the track to avoid false detections. In the case of known temperature stimuli, shape recognition techniques may be implemented in order to better discriminate the useful signal from the surrounding noise.

As shown in FIG. 3, the Raman backscatter loss profile 300 before applying the temperature stimulus 110 may be compared with the Rahman backscatter loss profile 302 measured when the temperature stimulus 110 is affecting the optical fiber temperature. The comparison signal 304 shows a negative or positive peak 306 (e.g., depending on the temperature stimulus) at a temperature spot distance d (e.g., 3.659 km in this example). In the example of FIG. 3, a positive temperature stimulus 110 may represent heating, and the difference may be determined by comparing the Anti-Stokes signal 302 in presence of the temperature stimulus 110 versus the Anti-Stokes signal 300 from the optical fiber 108 without the temperature stimulus 110. Under these conditions, a positive temperature stimulus 110 may result in an increase of the Anti-Stokes signal and thus a positive signal 306 on the comparison signal 304. In presence of a negative stimulus of temperature, the delta loss trace (e.g., the comparison signal 304) may show a negative peak. The signal may be taken as a reference and in this case, it would reverse the sign of the peak on the delta loss curve (e.g., the comparison signal 304). It may also be possible to use the absolute value or modulus of the delta loss to limit the search to positive peaks. Thus, the received Raman Anti-Stokes signal for the optical fiber 108 based on application of the temperature stimulus 110 may be compared to a reference signal acquired prior to application of the temperature stimulus 110 to identify the optical fiber 108 from a plurality of optical fibers.

If the temperature stimulus is applied on an optical fiber that is different from the optical fiber 108 that includes the OTDR and optical fiber connection device 102, the OTDR 104 would not detect a temperature spot on the optical fiber 108. However, since the temperature stimulus is calibrated to not affect transmission performance of neighboring optical fibers relative to the optical fiber 108, the neighboring optical fibers may continue to transmit signals without interruption.

In addition to event distance localization, the OTDR 104 may perform other measurements with respect to the detected event based on the temperature stimulus, such as peak amplitude associated with the temperature stimulus, spot width, or integrated amplitude. As an example, the full width at half maximum of the peak corresponding to the temperature stimulus may be measured to evaluate the length of the optical fiber impacted by this temperature stimulus. This width measurement may also be used to discriminate the peak temperature from noise peaks potentially narrower. These measurements may be stored to compare the effect of the temperature stimulus on several optical fibers in order to filter out the temperature side effect on neighboring optical fibers. Applying the stimulus on a multi-fiber cable or in the vicinity of other fibers can impact one or more neighboring fibers. Thus, for example, peak width, peak amplitude, or integrated amplitude may be used to determine the optical fiber most impacted by the temperature stimulus. This may make it possible to differentiate the optical fiber which is of interest from the others in the neighborhood.

Figure 4:
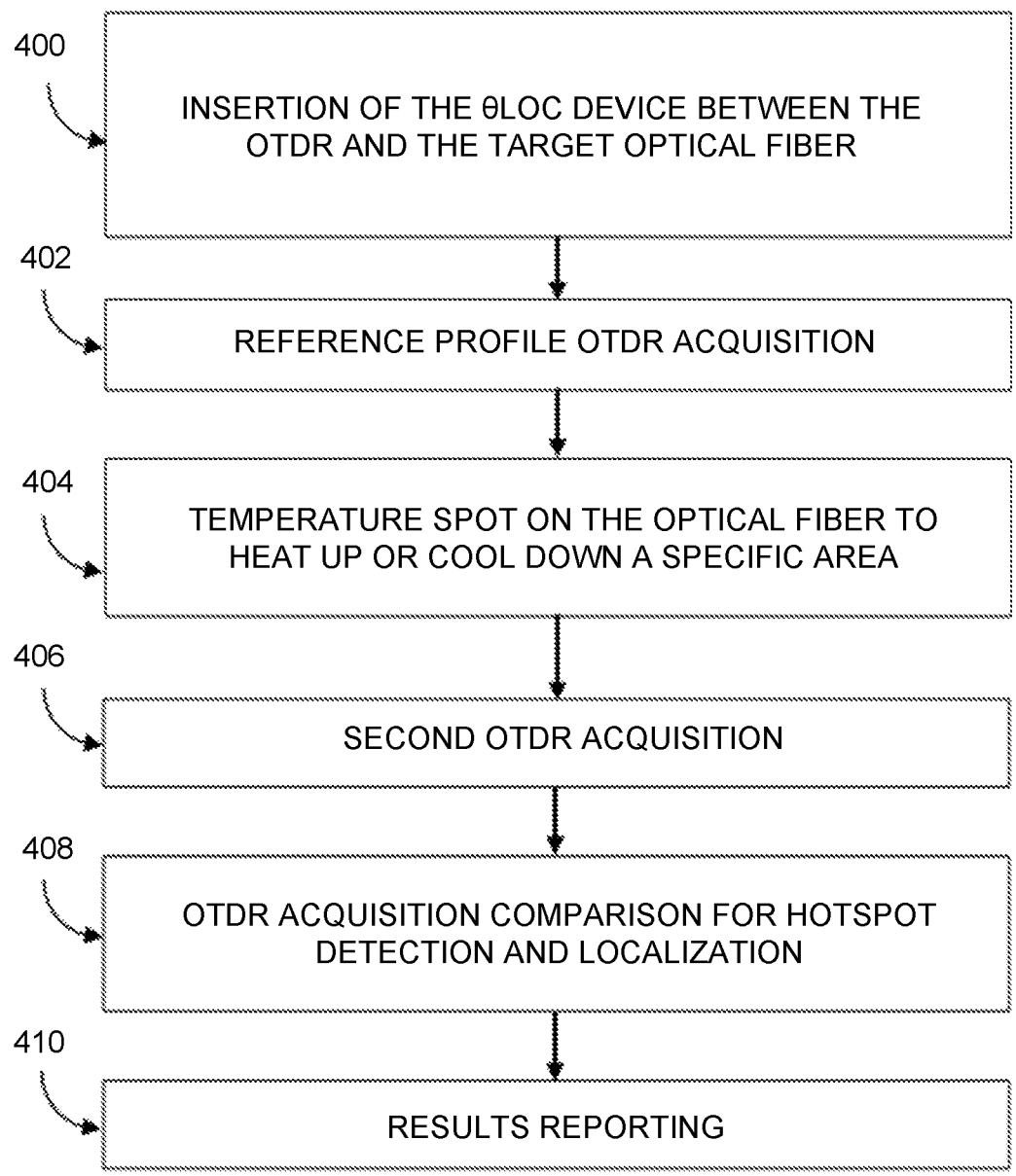
FIG. 4 illustrates a measurement process flow to illustrate operation of the optical fiber identification and distance measurement system of FIG. 1 in accordance with an example of the present disclosure.

FIG. 4 illustrates a measurement process flow to illustrate operation of the system 100 in accordance with an example of the present disclosure.

Referring to FIG. 4, at 400, the OTDR and optical fiber connection device 102 (e.g., BLOC device) may be inserted between the OTDR and the target optical fiber (e.g., fiber under test (FUT)).

At 402, the OTDR 104 may perform a reference measurement to acquire the distributed loss corresponding to the Raman Anti-Stokes backscattering signal.

At 404, the temperature application source 114 may apply a temperature stimulus 110 on the optical fiber 108.

At 406, after a warm up or cool down time for the temperature spot to be created on the optical fiber 108, a new OTDR acquisition of the Raman Anti-Stokes backscattering signal may be acquired by the OTDR 104 in the presence of the temperature stimulus.

At 408, the data from blocks 402 and 406 may be compared as disclosed herein with respect to FIG. 3 to detect and locate a variation due to the presence of the temperature stimulus. In this regard, the comparison of the two signals may be performed by utilizing a linear scale or a log scale such as a log scale that may be utilized for OTDR traces. The comparison may be performed by the temperature spot detection and localization process of the OTDR 104 (as disclosed herein with respect to FIG. 3).

At block 410, results of identification of the optical fiber may be reported on the OTDR display 116.

Figure 5:
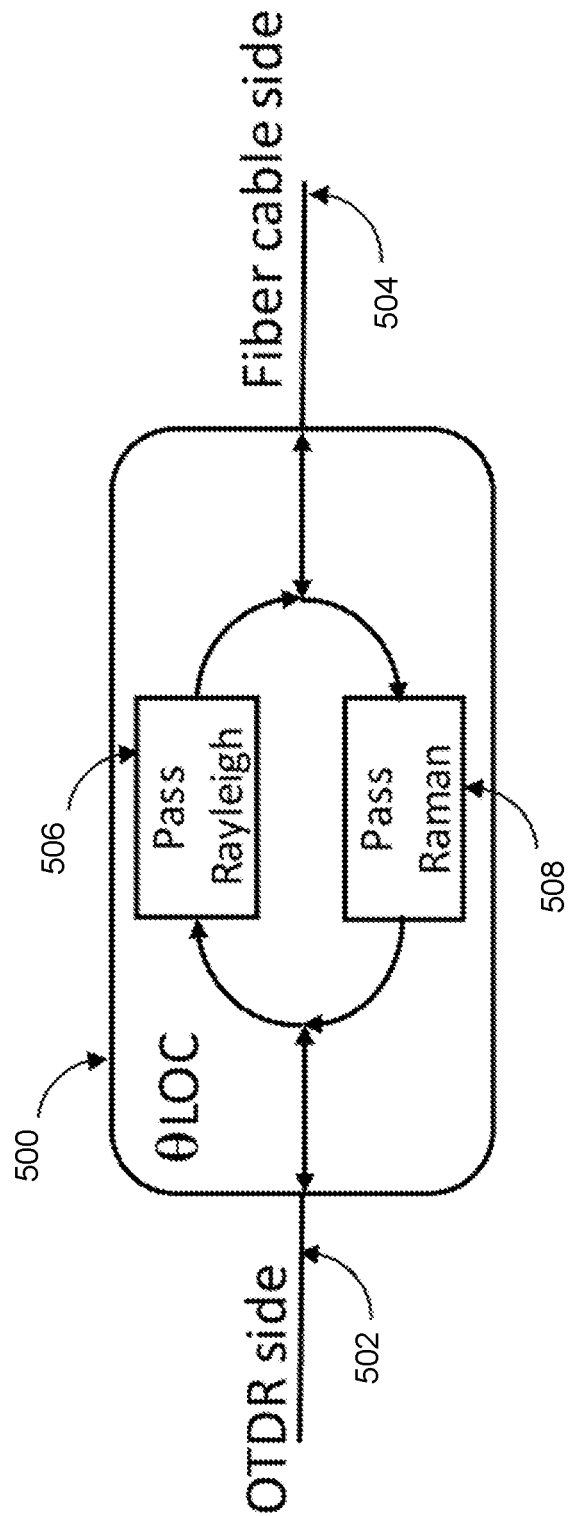
FIG. 5 illustrates a functional diagram of an OTDR and optical fiber connection device of the optical fiber identification and distance measurement system of FIG. 1 in accordance with an example of the present disclosure.

FIG. 5 illustrates a functional diagram of the OTDR and optical fiber connection device of the system 100 in accordance with an example of the present disclosure.

Referring to FIG. 5, the OTDR and optical fiber connection device (denoted OTDR and optical fiber connection device 500 for the embodiment of FIG. 5) may be formed as a two port device that connects the OTDR 104 at an OTDR side 502 to an optical fiber side 504. The OTDR and optical fiber connection device 500 may include a Rayleigh wavelength pass filter 506 in a forward direction, and a Raman wavelength pass filter 508 (e.g., blocking the Rayleigh wavelength) in a reverse (e.g., backward) direction.

As disclosed herein, the OTDR and optical fiber connection device 102 may operate with Raman Stokes as well as Raman Anti-Stokes. However, the temperature sensitivity of the Raman Anti-Stokes may be greater inside a maximum operating temperature of optical fiber cables. For example, FIG. 6 illustrates Raman Stokes and Raman Anti-Stokes temperature sensitivity to illustrate operation of the system 100 in accordance with an example of the present disclosure.

Figure 6:
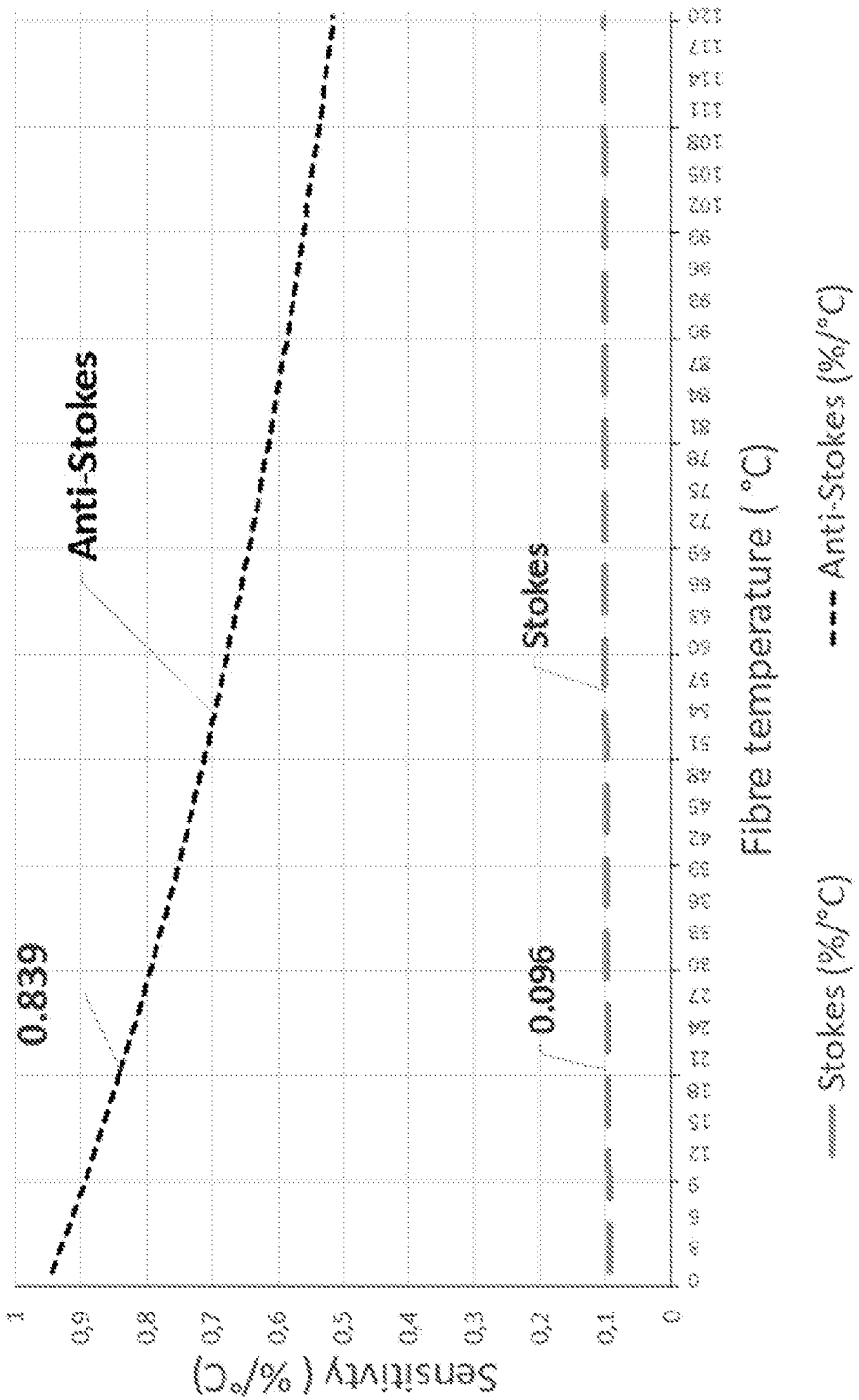
FIG. 6 illustrates Raman Stokes and Raman Anti-Stokes temperature sensitivity to illustrate operation of the optical fiber identification and distance measurement system of FIG. 1 in accordance with an example of the present disclosure.

Referring to FIG. 6, at room temperature, temperature sensitivity may be more than 0.8%/° C. for the Raman Anti-Stokes signal, and less than 0.1%/° C. for the Raman Stokes signal. For example, a positive temperature stimulus of 50° C. on a fiber operating at a room temperature of 20° C. may create a local variation of Anti-Stokes signal amplitude of about +25% (1 dB) and only less than 3% (e.g., 0.1 dB) on the Stokes signal.

Figure 7:
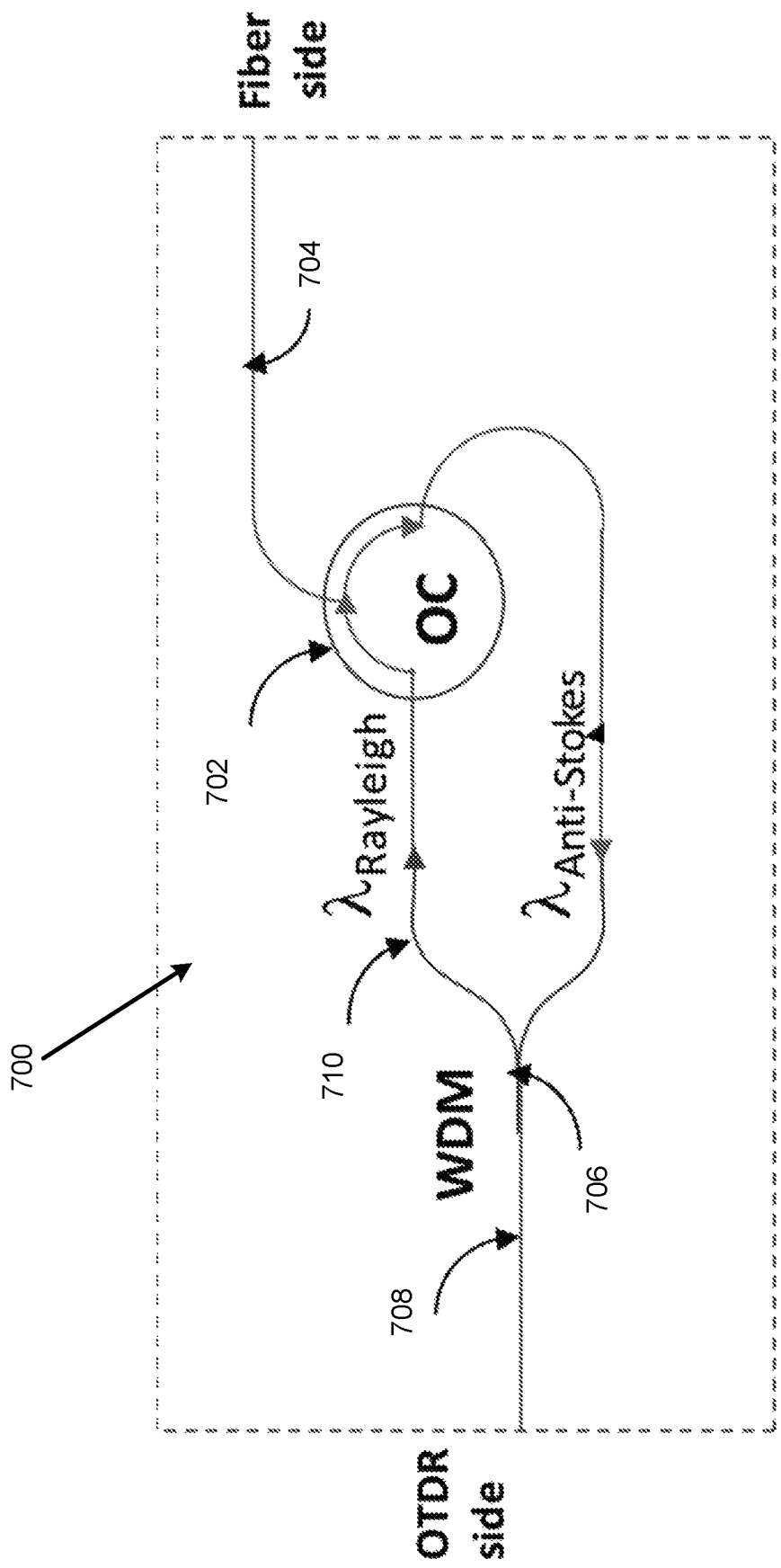
FIG. 7 illustrates another functional diagram of the OTDR and optical fiber connection device of the optical fiber identification and distance measurement system of FIG. 1 in accordance with an example of the present disclosure.

FIG. 7 illustrates another functional diagram of the OTDR and optical fiber connection device of the system 100 in accordance with an example of the present disclosure.

Referring to FIG. 7, compared to the embodiment of FIG. 5, the embodiment of FIG. 7 (e.g., the OTDR and optical fiber connection device 700) may utilize an optical circulator and a wavelength division multiplexing (WDM) coupling device. For example, an optical circulator 702 may be utilized as a coupling device on the optical fiber side 704, and the WDM device 706 may be utilized on the OTDR side 708. The optical circulator 702 may prevent the Rayleigh backscattering signal to return to the OTDR 104 through optical path 710. The WDM device 706 may function as a coupling and filtering device in both directions. Thus, the signal emitted by the OTDR at the Rayleigh wavelength will be transmitted to the optical fiber side 704 and the Rayleigh backscattering signal coming from this same fiber may be blocked by the optical circulator 702 on one side and on the other side, by the WDM device 706 in favor of the Raman backscattering signal to be analyzed by the OTDR connected to optical fiber on the OTDR side 708.

Figure 8:
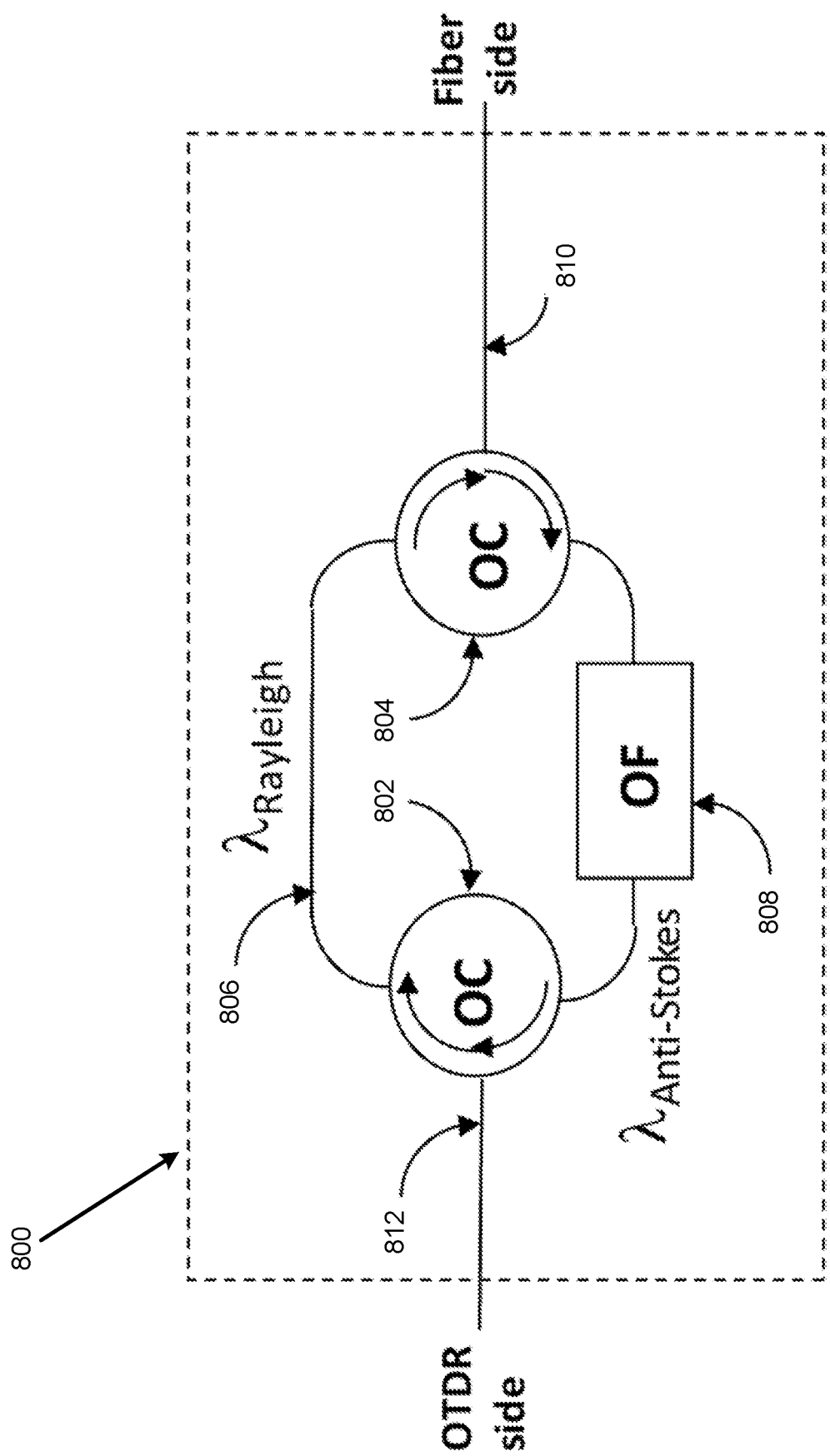
FIG. 8 illustrates another functional diagram of the OTDR and optical fiber connection device of the optical fiber identification and distance measurement system of FIG. 1 in accordance with an example of the present disclosure.

FIG. 8 illustrates another functional diagram of the OTDR and optical fiber connection device of the system 100 in accordance with an example of the present disclosure.

Referring to FIG. 8, compared to the embodiments of FIGS. 5 and 7, the embodiment of FIG. 8 (e.g., the OTDR and optical fiber connection device 800) may utilize two optical circulators, and a filter on the return channel. In the embodiment of FIG. 8, the Rayleigh signal from the OTDR 104 may go through the optical circulator 802 and then through the optical circulator 804. The Rayleigh backscattering signal may be blocked on the two return paths, on the Rayleigh branch 806 by the two optical circulators in series, and on the branch with the optical filter 808 in the reverse direction. Thus, the optical circulator 804 may be utilized as a coupling device on the optical fiber side 810, and the optical circulator 802 may be utilized on the OTDR side 812. Another optical filter (not shown) that blocks the Anti-Stokes signal may be inserted into the Rayleigh branch 806 to avoid possible reinjection of the Anti-Stokes signal into the optical fiber due to strong optical reflections on the OTDR side.

For the examples of FIGS. 5, 7, and 8, the OTDR and optical fiber connection device 102 (illustrated in FIGS. 5, 7, and 8, respectively, as OTDR and optical fiber connection device 500, 700, and 800) may include an optical fiber connection on both sides, or may be directly pluggable on the OTDR 104 optical port. The OTDR and optical fiber connection device 102 may also be implemented using free space bulk optic or integrated photonics technologies.

The temperature stimulus 110 may be achieved by various means. For example, the temperature application source 114 may include freeze spray, an ice bag, a heat pad, a warm/hot air source, a heat gun, a thermoelectric Peltier clip, induction heating on the metallic part of the fiber optic cable, a heating cable or cord, a heating tape or another type of temperature generator with a temperature range in compliance with the fiber optic cable characteristics or with an embedded temperature control. Since the optical fiber identification is based on temperature variation, the temperature stimulus may be applied before the reference measurement and removed thereafter.

The temperature stimulus 110 may also be of a natural origin. In this regard, the temperature stimulus 110 may impact a longer optical fiber length and not just a localized area of the optical fiber 108. For example, natural phenomena may affect buried fiber optic cables (e.g., soil movements, sandstorms, flooding, etc.). Thus, variations of the Anti-Stoke response may be detected either on the same fiber optic cable at different times or in comparison with other fiber optic cables. For example, in a desert area, natural phenomena may include the detection of a buried fiber optic cable that is again in the open air because of a sand storm. In this case, the natural stimulus may include daily variations of temperature that may be much more visible on the now non-buried part of the fiber optic cable.

The OTDR and optical fiber connection device 102 may also be used to perform fiber cable network redundancy checking if the fiber optic cables have alternate routes and do not follow the same path. In this regard, the temperature stimulus 110 may be implemented by a user, or may be implemented locally from a natural source that provides a different Anti-Stokes time variation signature to the primary versus the secondary fiber optic cable. The primary cable may be used under normal conditions to provide communication between two points of the network. If there is a problem on this primary cable, the traffic can be switched to a secondary (e.g., back-up) cable that always connects these two points of the network by using a route (path) different from the first one. This provides an alternate routing between the two points in case the primary optical path is broken or disrupted. In the case of a temperature stimulus 110 applied by a user, fiber optic cable routing issues may be detected when temperature spots are detected in the same location (e.g., man hole) on both a primary cable and a secondary cable that was supposed to include an alternate route.

The OTDR and optical fiber connection device 102 may also utilize natural temperature spots when there is a non-permanent local temperature variation on an optical fiber. For example, a buried fiber optic cable that may be regularly flooded with water during bad weather may be identified using this principle in a fiber monitoring mode of the OTDR 104.

Anti-Stokes variations may also be used to identify an aerial path from buried paths of a fiber optic cable because of the difference of thermal inertia (e.g., day/night temperature variation). Underground fiber optic cables may be less sensitive to variations of the ambient air temperature than overhead/aerial cables. Thus, the temperature variations of a buried fiber optic cable and therefore the variations of amplitudes of the Anti-Stokes signal may be less than on an aerial cable which may be sensitive to the ambient temperature variation due to weather conditions such as sunshine or day/night temperature variations. Measuring then comparing the Anti-Stokes traces acquired at different times may be used to differentiate aerial sections of a fiber optic link from the buried ones.

Concerning buried fiber optic cables, if a user is able to generate a temperature stimulus on the surface that is strong enough to impact the temperature of an optical fiber inside a buried fiber optic cable, the fiber optic cable may be located, and along with the fiber optic cable, on the surface the position of a possible fiber cut or other issues that generate significant optical loss may also be located. Thus, a temperature stimulus applied before the defect (e.g., OTDR side) may be likely to be detected when it will no longer be detected after the defect.

Performance of the optical fiber identification and localization may depend on a combination of the different elements of the system 100 (e.g., OTDR hardware and software, OTDR and optical fiber connection device 102, temperature application source 114, etc.), and also on the fiber optic cable itself and its environment. For example, an increase in a dynamic range of the OTDR may result in a corresponding increase in performance of the system 100 (e.g., longer distance range, increased spatial resolution, and higher temperature sensitivity).

Figure 9:
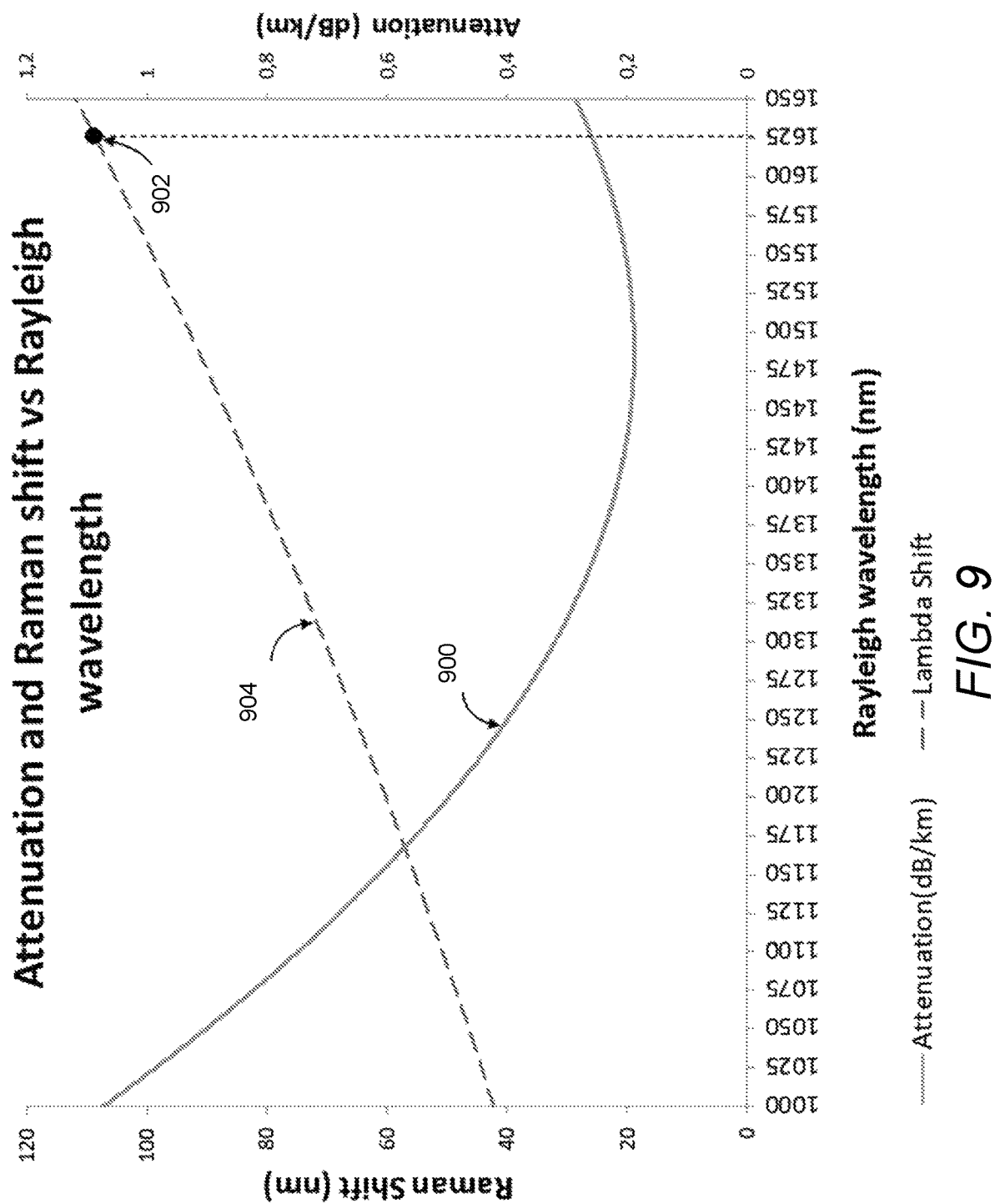
FIG. 9 illustrates wavelength shift for different Rayleigh wavelengths to illustrate operation of the optical fiber identification and distance measurement system of FIG. 1 in accordance with an example of the present disclosure.

For the system 100, the Rayleigh wavelength bandwidth and the corresponding Raman wavelength bandwidth may be selected according to a wavelength difference based on the Raman frequency shift. In this regard, assuming that temperature is not being measured, a high accuracy of the wavelength difference may not be needed. In addition, the Raman spectrum may be relatively broad and may not require a high wavelength accuracy for the optical filtering. For example, FIG. 9 illustrates wavelength shift for different Rayleigh wavelengths to illustrate operation of the system 100 in accordance with an example of the present disclosure. Referring to FIG. 9, a wavelength shift for different Rayleigh wavelengths 900 may be based on a single mode fiber frequency shift of approximately 13.2 THz. For example, a single wavelength 1625 nm OTDR may be used with an OTDR and optical fiber connection device 102 to deal with a Raman wavelength shift of approximately 109 nm (e.g., at 902) corresponding to a 1516 nm Anti-Stokes wavelength.

For the system 100, the OTDR 104 may include a single or multiple wavelength OTDR. Moreover, the OTDR 104 may include a time domain reflectometer, as well as an optical frequency domain reflectometer. For the OTDR 104, with respect to a wavelength range, a shorter OTDR wavelength may correspond to a smaller Raman wavelength shift, and higher fiber attenuation 900 for the Raman signal. These features may also be utilized with an active optical fiber if there is room for both the optical spectrum of the traffic and for the Raman/Rayleigh signals. The trace in dotted line at 904 may represent the difference between the wavelength of the transmitted light (called Rayleigh wavelength) and the wavelength of Anti-Stokes signals. In FIG. 9, the wavelength of the incident signal may also be called the Rayleigh wavelength because the Rayleigh scattering does not show a frequency shift (or wavelength shift) because it is an elastic phenomenon unlike the Raman scattering.

The system 100 may operate with both in-service or out-of-service optical fibers. For example, the out-of-service optical fiber may represent an optical fiber that does not include any traffic. For the in-service optical fiber, an appropriate wavelength division technique may be utilized. For example, in the case of fiber optic communications, wavelength division multiplexing (WDM) is a technology that multiplexes a number of optical carrier signals on a single optical fiber using different wavelengths. In the current application, the wavelength division multiplexing may make it possible to cohabit the communication signal and the test signal by choosing bands of different wavelengths. For example, wavelengths lower than 1350 nm (e.g., 1310 nm) may be reserved for optical communication signals while wavelengths higher than 1350 nm may be dedicated to the Raman Anti-Stokes signal measurement system using by example a stimulus at 1550 nm generating an Anti-Stokes signal wavelength at approximately 1450 nm. In this regard, a fiber monitoring system may use a switchable OTDR and optical fiber connection device 102 for on-demand fiber identification and localization.

The system 100 may operate with single mode or multimode fiber optic cables using corresponding optical reflectometers. The phenomenon of Raman scattering may be present irrespective of the type of silica-based optical fiber (e.g., monomodal or multimodal). The principle of measuring Anti-Stokes signals may remain the same.

Figure 10:
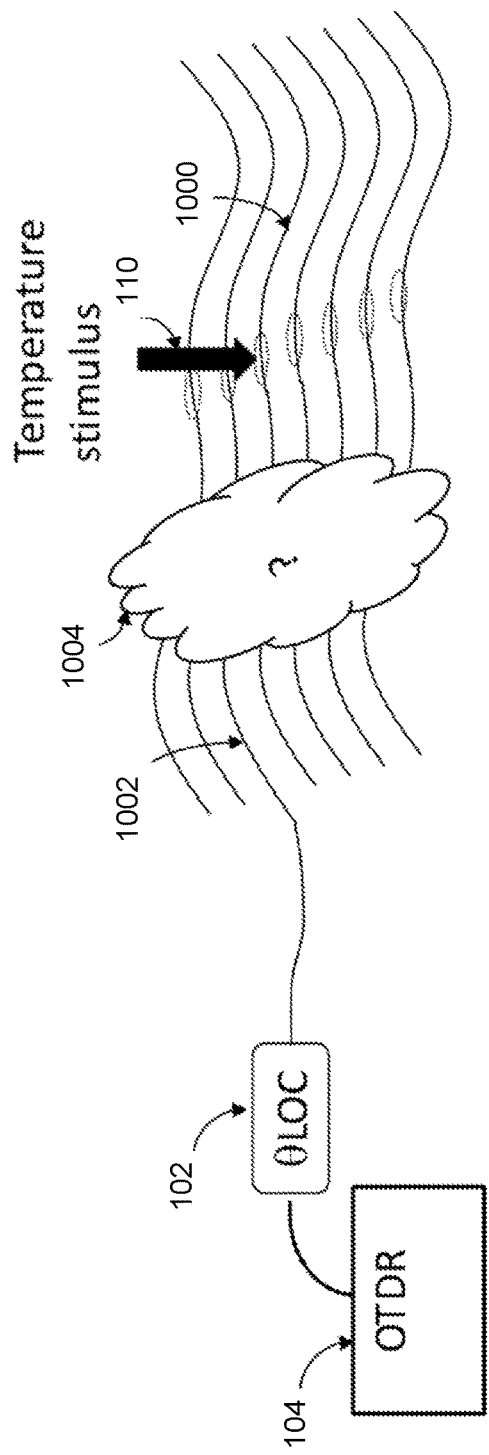
FIG. 10 illustrates a use case that includes movement of a temperature stimulus to illustrate operation of the optical fiber identification and distance measurement system of FIG. 1 in accordance with an example of the present disclosure.

With respect to multifiber applications, FIG. 10 illustrates a use case that includes movement of a temperature stimulus to illustrate operation of the system 100 in accordance with an example of the present disclosure. Referring to FIG. 10, the temperature stimulus 110 may be moved (e.g., at 1000) from fiber to fiber to identify the fiber end 1002 on which the OTDR and optical fiber connection device 102 is connected. In this regard, topology of the network 1004 may include various uncertainties associated with an environment of the optical fibers. Thus, for FIG. 10, the received Raman Anti-Stokes signal for the optical fiber 1000 may be compared to Raman Anti-Stokes signals for other optical fibers of the plurality of optical fibers shown to identify the optical fiber 1000.

Figure 11:
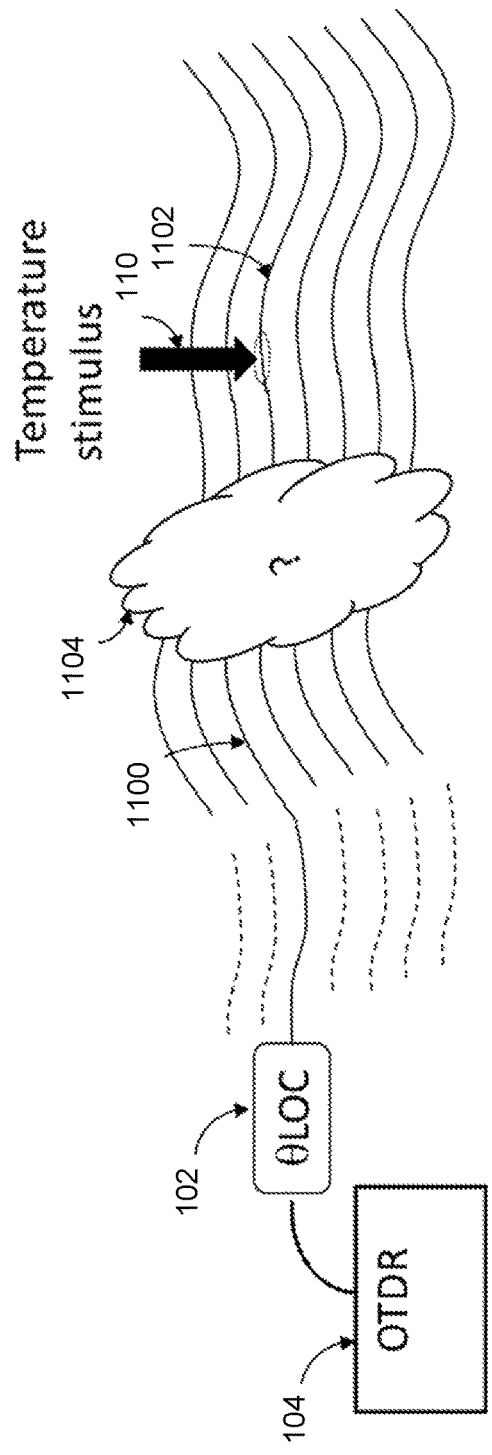
FIG. 11 illustrates another use case that includes movement of the OTDR and optical fiber connection device to illustrate operation of the optical fiber identification and distance measurement system of FIG. 1 in accordance with an example of the present disclosure.

With respect to multifiber applications, FIG. 11 illustrates another use case that includes movement of the OTDR and optical fiber connection device to illustrate operation of the system 100 in accordance with an example of the present disclosure. Referring to FIG. 11, the OTDR and optical fiber connection device 102 may be moved from optical fiber end to optical fiber end (e.g., at 1100) to identify the optical fiber 1102 on which the temperature stimulus 110 is applied. In this case, the OTDR and optical fiber connection device 102 may be connected to the optical fiber ends through an optical switch to sequentially test all the optical fibers in an automated mode. The topology of the network 1104 may similarly include various uncertainties associated with an environment of the optical fibers.

The temperature application source 114 may need to be spatially selective to avoid temperature side effects on neighboring optical fibers. For example, irrespective of whether the technology for the temperature application source 114 utilizes gas means, liquid means, solid means, etc., a higher precision temperature spot may result in increased performance of the system 100.

Figure 12:
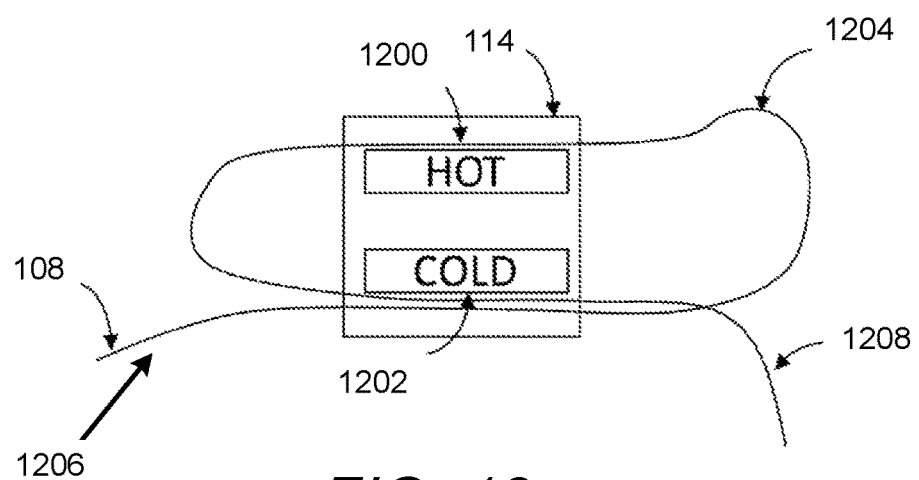
FIG. 12 illustrates utilization of a thermoelectric Peltier cell to illustrate operation of the optical fiber identification and distance measurement system of FIG. 1 in accordance with an example of the present disclosure.
Figure 13:
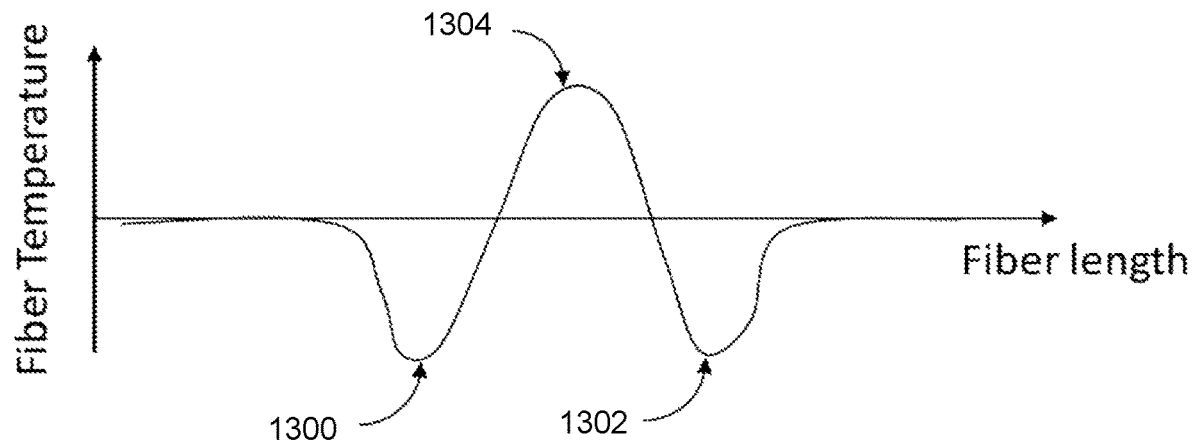
FIG. 13 illustrates optical fiber temperature distribution based on the utilization of the thermoelectric Peltier cell to illustrate operation of the optical fiber identification and distance measurement system of FIG. 1 in accordance with an example of the present disclosure.

FIG. 12 illustrates utilization of a thermoelectric Peltier cell to illustrate operation of the system 100 in accordance with an example of the present disclosure. FIG. 13 illustrates optical fiber temperature distribution based on the utilization of the thermoelectric Peltier cell to illustrate operation of the system 100 in accordance with an example of the present disclosure.

With respect to FIG. 12, the temperature stimulus 110 may alternatively include a complex signature to improve the detection capability. For example, the signature of the temperature stimulus 110 may show a time-dependent amplitude or distance dependent signature. For example, as shown in FIG. 12, a thermoelectric Peltier cell may be used to create one central temperature spot and two others on both sides of the central spot. In this regard, the temperature application source 114 may use a Peltier cell to generate a differential temperature along the optical fiber 108. The optical fiber may pass alternatively close to hot side 1200 and then to the cold side 1202 creating two temperature peaks (e.g., at 1300 and 1302 of FIG. 13) on both sides of a central peak (e.g., 1304 of FIG. 13) that shows a temperature difference. For FIGS. 12 and 13, the loop 1204 may be made on a single optical fiber between points 1206 and 1208. This thermoelectric system may be also used by passing two different optical fibers that may be readily differentiated based on being subjected to a temperature stimulus of opposite directions.

FIG. 14 illustrate a flowchart of a method 1400 for optical fiber identification and distance measurement, according to examples. The method 1400 may be implemented on the system 100 described above with reference to FIGS. 1 and 3-13 by way of example and not limitation. The method 1400 may be practiced in other systems.

Referring to FIGS. 1 and 2-14, and particularly FIG. 14, at block 1402, the method 1400 may include controlling, in one direction, passage of an optical reflectometer signal to an optical fiber 108.

At block 1404, the method 1400 may include controlling in another direction, passage of Rayleigh backscattering from the optical reflectometer signal.

At block 1406, the method 1400 may include controlling, in the another direction, passage of a Raman signal from the optical fiber 108.

At block 1408, the method 1400 may include identifying, based on the received Raman signal and a temperature stimulus 110 applied to the optical fiber 108, the optical fiber 108 from a plurality of optical fibers (e.g., see FIGS. 1, and 3-13).

According to examples disclosed herein, the method may include identifying, based on the received Raman signal and the temperature stimulus 110 applied to the optical fiber 108, a location of the temperature stimulus 110 applied to the optical fiber (e.g., see FIG. 1, OTDR display 116 that shows a location of the temperature stimulus 110 at 3.659 km).

According to examples disclosed herein, the method may include determining, based on the received Raman signal and the temperature stimulus 110 applied to the optical fiber 110, a distance from one end of the optical fiber 110 to a location of application of the temperature stimulus (e.g., see FIG. 1, OTDR display 116 that shows a distance of 3.659 km).

According to examples disclosed herein, controlling, in one direction, passage of the optical reflectometer signal to the optical fiber, controlling in another direction, passage of Rayleigh backscattering from the optical reflectometer signal, and controlling, in the another direction, passage of the Raman signal from the optical fiber may include controlling in the one direction, by a Rayleigh wavelength pass filter 506, passage of the optical reflectometer signal to the optical fiber, controlling in the another direction, by a Raman wavelength pass filter 508, passage of Rayleigh backscattering from the optical reflectometer signal, and controlling in the another direction, by the Raman wavelength pass filter 508, passage of the Raman signal from the optical fiber.

According to examples disclosed herein, controlling, in one direction, passage of the optical reflectometer signal to the optical fiber, controlling in another direction, passage of Rayleigh backscattering from the optical reflectometer signal, and controlling, in the another direction, passage of the Raman signal from the optical fiber may include controlling in the one direction, by an optical circulator 702, passage of the optical reflectometer signal to the optical fiber, controlling in the another direction, by the optical circulator 702, passage of Rayleigh backscattering from the optical reflectometer signal, and controlling in the another direction, by a wavelength division multiplexing (WDM) coupling device 706, passage of the Raman signal from the optical fiber.

According to examples disclosed herein, controlling, in one direction, passage of the optical reflectometer signal to the optical fiber, controlling in another direction, passage of Rayleigh backscattering from the optical reflectometer signal, and controlling, in the another direction, passage of the Raman signal from the optical fiber may include controlling in the one direction, by an optical circulator 802, passage of the optical reflectometer signal to the optical fiber, controlling in the another direction, by another optical circulator 804, passage of Rayleigh backscattering from the optical reflectometer signal, and controlling in the another direction, by an optical filter 808, passage of the Raman signal from the optical fiber.

According to examples disclosed herein with respect to FIG. 10, identifying, based on the received Raman signal and the temperature stimulus applied to the optical fiber, the optical fiber from a plurality of optical fibers may further include applying the temperature stimulus 110 to different optical fibers of the plurality of optical fibers, and identifying, based on the application of the temperature stimulus 110 to different optical fibers of the plurality of optical fibers, the optical fiber from the plurality of optical fibers.

Figure 15:
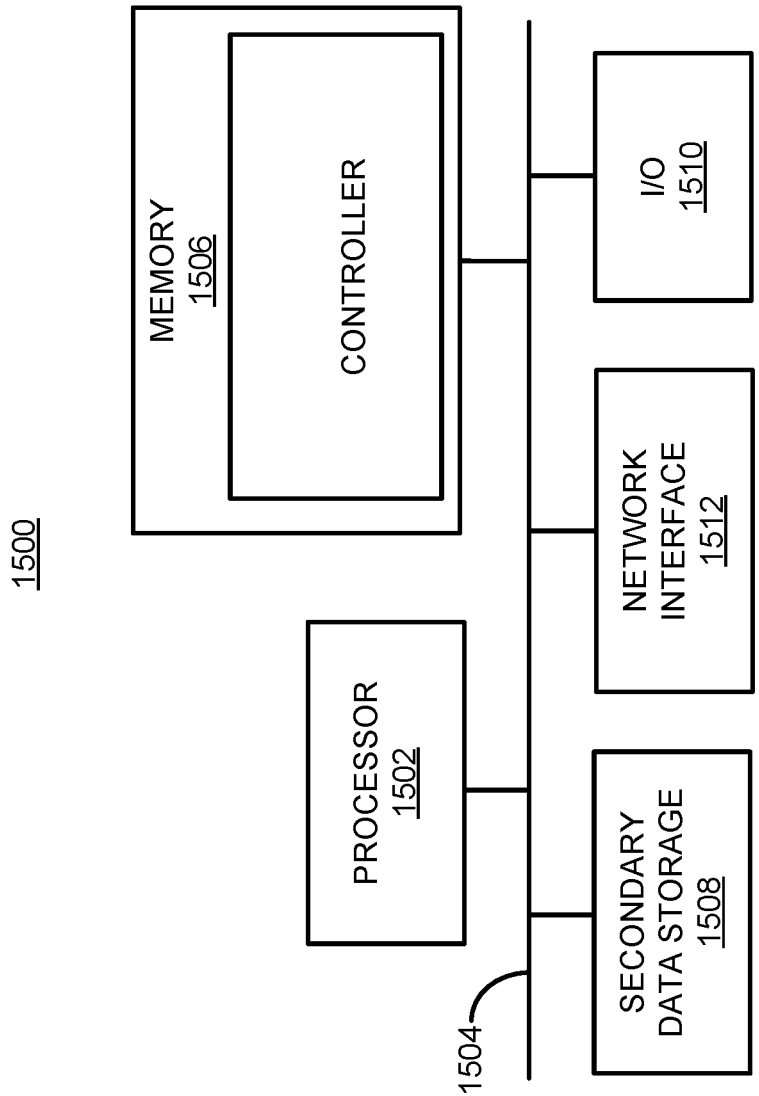
FIG. 15 illustrates a computer system, according to an example of the present disclosure.

FIG. 15 shows a computer system 1500 that may be used with the examples described herein. The computer system may represent a platform that includes components that may be in a server or another computer system. The computer system 1500 may be used as part of a platform for controllers of the system 100 (generally designated controller in FIG. 15). The computer system 1500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1500 may include a processor 1502 that may implement or execute machine readable instructions performing some or all of the methods, functions and other processes described herein. Commands and data from the processor 1502 may be communicated over a communication bus 1504. The computer system may also include a main memory 1506, such as a random access memory (RAM), where the machine readable instructions and data for the processor 1502 may reside during runtime, and a secondary data storage 1508, which may be non-volatile and stores machine readable instructions and data. The memory and data storage are examples of computer readable mediums. The main memory 1506 may include the controller (e.g., for the system 100) including machine readable instructions residing in the main memory 1506 during runtime and executed by the processor 1502.

The computer system 1500 may include an input/output (I/O) device 1510, such as a keyboard, a mouse, a display, etc. The computer system may include a network interface 1512 for connecting to a network. Other known electronic components may be added or substituted in the computer system.

The processor 1502 may be designated as a hardware processor. The processor 1502 may execute operations associated with various components of the system 100. For example, the processor 1502 may execute operations associated with the controller (e.g., for the system 100), etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A system comprising:
   a reflectometer and optical fiber connection device comprising:
   a Rayleigh wavelength pass filter to pass, in one direction, a Rayleigh signal of an optical reflectometer signal to an optical fiber; and
   a Raman wavelength pass filter to:
   filter out, in another direction, Rayleigh backscattering from the optical reflectometer signal; and
   pass, in the another direction, a Raman Anti-Stokes signal from the optical fiber,
   wherein the Raman wavelength pass filter is different from the Rayleigh wavelength pass filter.

2. The system according to claim 1, further comprising:
   a fiber optic optical reflectometer to:
   generate the optical reflectometer signal;
   receive the Raman Anti-Stokes signal from the optical fiber; and
   identify, based on the received Raman Anti-Stokes signal and a temperature stimulus applied to the optical fiber, the optical fiber from a plurality of optical fibers.

3. The system according to claim 2, wherein the fiber optic optical reflectometer includes an optical time domain reflectometer (OTDR).

4. The system according to claim 2, wherein the fiber optic optical reflectometer includes an optical frequency domain reflectometer.

5. The system according to claim 2, wherein the fiber optic optical reflectometer is to identify, based on the received Raman Anti-Stokes signal and the temperature stimulus applied to the optical fiber, the optical fiber from the plurality of optical fibers by:
comparing the received Raman Anti-Stokes signal for the optical fiber to Raman Anti-Stokes signals for other optical fibers of the plurality of optical fibers.

6. The system according to claim 2, wherein the fiber optic optical reflectometer is to identify, based on the received Raman Anti-Stokes signal and the temperature stimulus applied to the optical fiber, the optical fiber from the plurality of optical fibers by:
comparing the received Raman Anti-Stokes signal for the optical fiber based on application of the temperature stimulus to a reference signal acquired prior to application of the temperature stimulus.

7. The system according to claim 2, further comprising:
a remote controlled temperature application source to generate the temperature stimulus upon actuation of the temperature application source.

8. The system according to claim 2, further comprising:
a temperature application source to implement the temperature stimulus by heating up of the optical fiber.

9. The system according to claim 2, further comprising:
a temperature application source to implement the temperature stimulus by cooling down of the optical fiber.

10. The system according to claim 1, further comprising:
a fiber optic optical reflectometer connected to a connection of the reflectometer and optical fiber connection device to transmit the optical reflectometer signal towards the optical fiber, wherein the optical fiber is connected to another connection of the reflectometer and optical fiber connection device to transmit signals back to the reflectometer and optical fiber connection device.

11. A system comprising:
a reflectometer and optical fiber connection device comprising:
a filter to pass, in one direction, a Rayleigh signal of an optical reflectometer signal to an optical fiber; and
another filter to pass, in another direction, a Raman signal from the optical fiber.

12. The system according to claim 11, wherein the Raman signal includes a Raman Stokes signal.

13. The system according to claim 11, wherein the Raman signal includes a Raman Anti-Stokes signal.

14. A method comprising:
controlling, in one direction, passage of an optical reflectometer signal to an optical fiber;
controlling in another direction, passage of Rayleigh backscattering from the optical reflectometer signal;
controlling, in the another direction, passage of a Raman signal from the optical fiber; and
identifying, by a processor, based on the Raman signal and a temperature stimulus applied to the optical fiber, the optical fiber from a plurality of optical fibers.

15. The method according to claim 14, further comprising:
identifying, based on the Raman signal and the temperature stimulus applied to the optical fiber, a location of the temperature stimulus applied to the optical fiber.

16. The method according to claim 14, further comprising:
determining, based on the Raman signal and the temperature stimulus applied to the optical fiber, a distance from one end of the optical fiber to a location of application of the temperature stimulus.

17. The method according to claim 14, wherein controlling, in one direction, passage of the optical reflectometer signal to the optical fiber, controlling in another direction, passage of Rayleigh backscattering from the optical reflectometer signal, and controlling, in the another direction, passage of the Raman signal from the optical fiber further comprises:
controlling in the one direction, by a Rayleigh wavelength pass filter, passage of the optical reflectometer signal to the optical fiber;
controlling in the another direction, by a Raman wavelength pass filter, passage of Rayleigh backscattering from the optical reflectometer signal; and
controlling in the another direction, by the Raman wavelength pass filter, passage of the Raman signal from the optical fiber.

18. The method according to claim 14, wherein controlling, in one direction, passage of the optical reflectometer signal to the optical fiber, controlling in another direction, passage of Rayleigh backscattering from the optical reflectometer signal, and controlling, in the another direction, passage of the Raman signal from the optical fiber further comprises:
controlling in the one direction, by an optical circulator, passage of the optical reflectometer signal to the optical fiber;
controlling in the another direction, by the optical circulator, passage of Rayleigh backscattering from the optical reflectometer signal; and
controlling in the another direction, by a wavelength division multiplexing (WDM) coupling device, passage of the Raman signal from the optical fiber.

19. The method according to claim 14, wherein controlling, in one direction, passage of the optical reflectometer signal to the optical fiber, controlling in another direction, passage of Rayleigh backscattering from the optical reflectometer signal, and controlling, in the another direction, passage of the Raman signal from the optical fiber further comprises:
controlling in the one direction, by an optical circulator, passage of the optical reflectometer signal to the optical fiber;
controlling in the another direction, by another optical circulator, passage of Rayleigh backscattering from the optical reflectometer signal; and
controlling in the another direction, by an optical filter, passage of the Raman signal from the optical fiber.

20. The method according to claim 14, wherein identifying, based on the Raman signal and the temperature stimulus applied to the optical fiber, the optical fiber from a plurality of optical fibers further comprises:
applying the temperature stimulus to different optical fibers of the plurality of optical fibers; and
identifying, based on the application of the temperature stimulus to different optical fibers of the plurality of optical fibers, the optical fiber from the plurality of optical fibers.

* * * * *